Aug. 22, 1933.     C. S. BRAGG ET AL     1,923,185
HYDRAULIC BRAKE SYSTEM FOR AUTOMOTIVE VEHICLES
Filed March 27, 1928     3 Sheets-Sheet 1
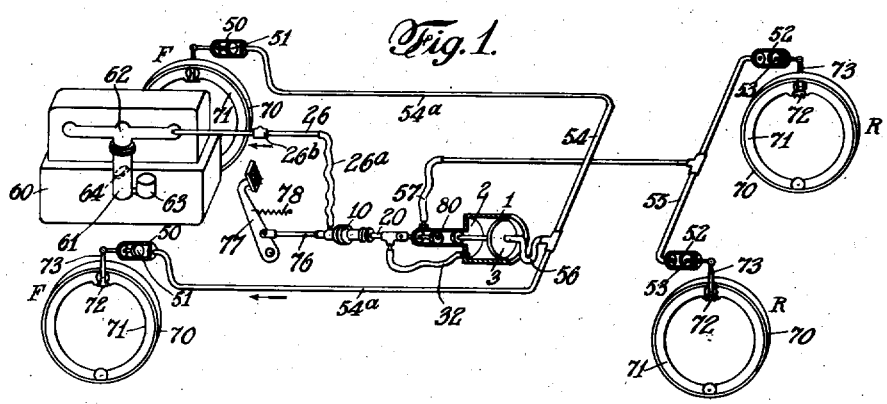

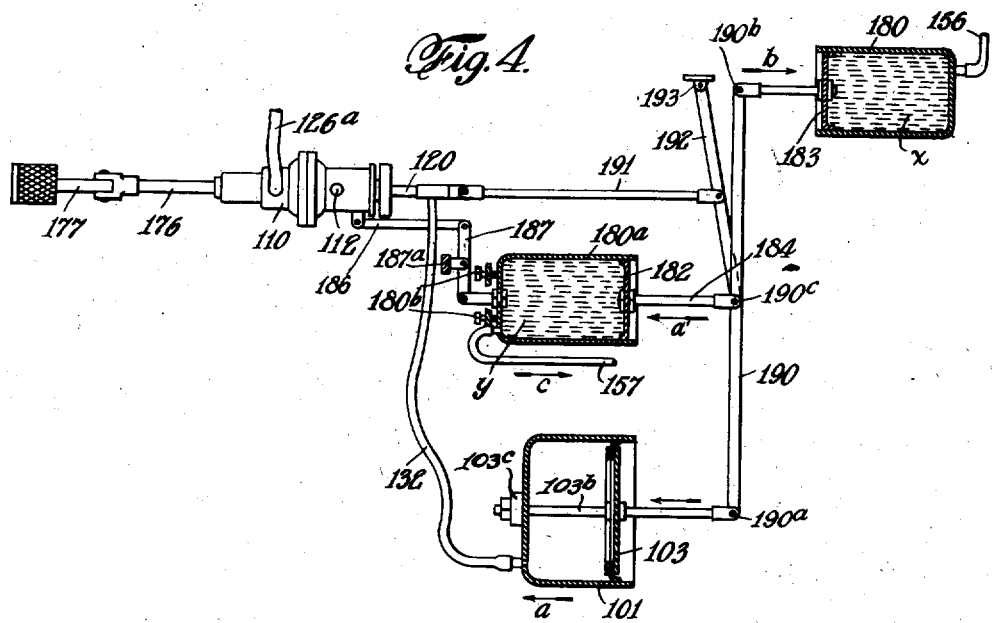
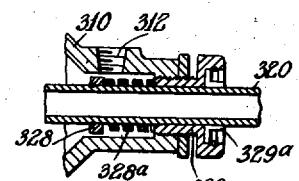
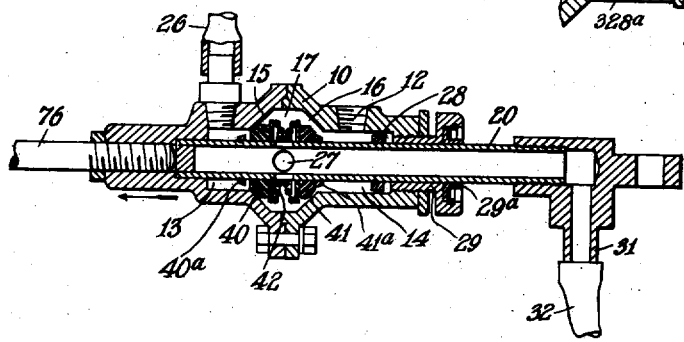

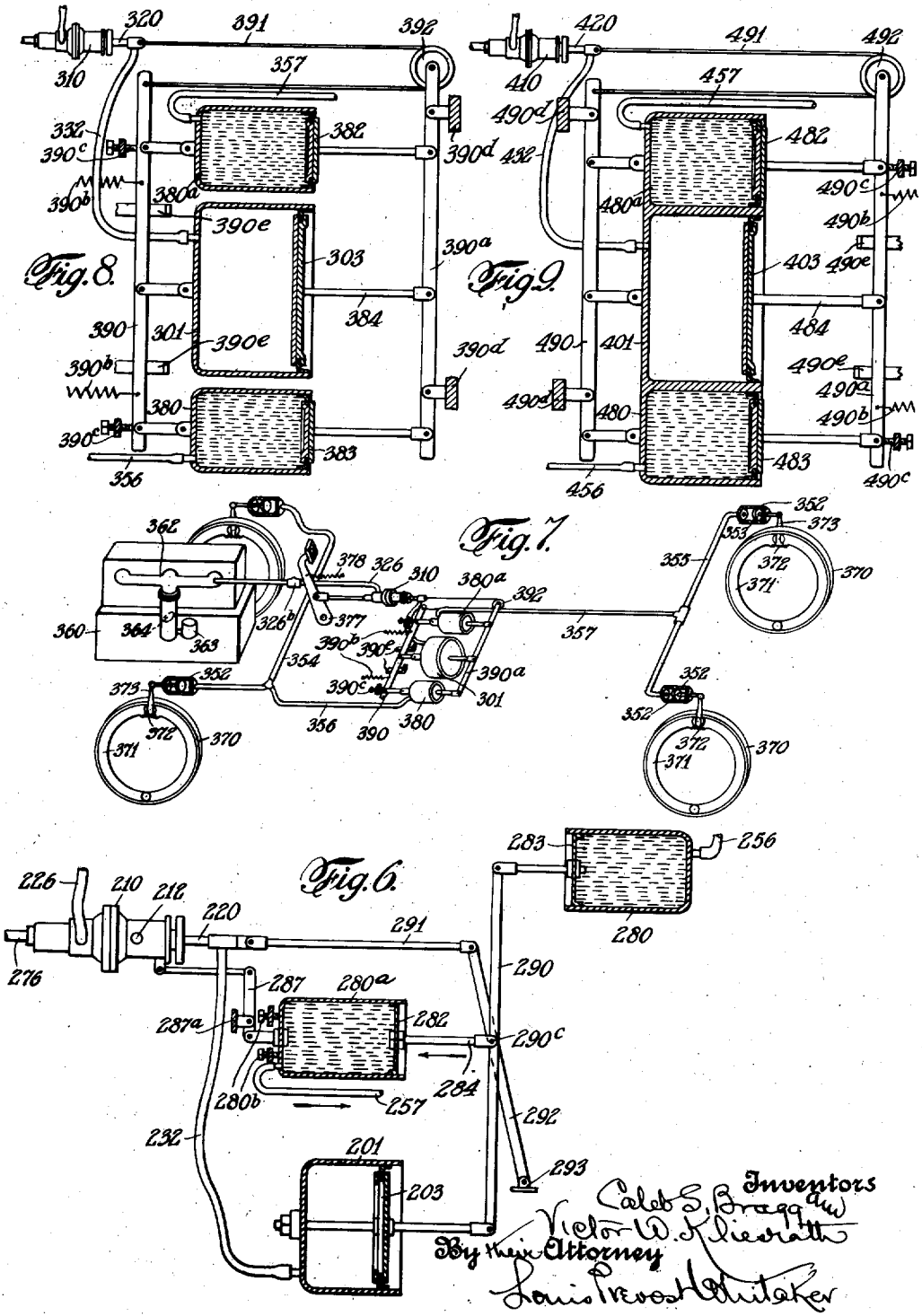

Patented Aug. 22, 1933

1,923,185

UNITED STATES PATENT OFFICE 1,923,185

HYDRAULIC BRAKE SYSTEM FOR AUTOMOTIVE VEHICLES

Caleb S. Bragg, Palm Beach, Fla., and Victor W. Kliesrath, Port Washington, N. Y., assignors to Bragg-Kliesrath Corporation, Long Island City, N. Y., a Corporation of New York Application March 27, 1928. Serial No. 265,091

33 Claims. (Cl. 188—152)

Our invention consists in the novel features hereinafter described, reference being had to the accompanying drawings which show several embodiments of the invention selected by us for purposes of illustration, and the said invention is fully disclosed in the following description and claims.

Our invention relates to hydraulic brake systems for automotive vehicles and has for its object to provide independently operable brake mechanisms for a plurality of pairs of wheels for the vehicle including the steering wheels and non-steering or traction wheels, all of which are simultaneously applied by a pressure cylinder, or cylinders, operated by a power actuator, or actuators, which is, or are, operated by a substantially constant differential of fluid pressures conveniently obtained by utilizing the differential of pressures between the partial vacuum obtained by a connection to the throttle controlled suction passage for the internal combustion engine for propelling the vehicle, between the throttle valve and the engine cylinders, (the degree of rarification in which passage is substantially constant when the throttle valve is closed, which is the correct position when the brakes are to be applied,) and a higher fluid pressure, as atmospheric for example, the capacity of the actuator or the leverages at which its power is applied to the brake mechanisms through the hydraulic system, or both, being such that the brake mechanisms for both the front or steering wheels and the non-steering or driving wheels, can be simultaneously applied by the actuator to the full extent of its power, without ordinarily locking the front or steering wheels upon the average dry pavement or roadway, and preferably without locking the non-steering or driving wheels upon the average dry pavement or roadway even when the vehicle is lightly loaded, means being provided whereby the physical force of the operator may be added to the brake mechanisms for the non-steering or driving wheels only, to supplement the action of the power actuator in stopping the vehicle when heavily loaded, or in making emergency stops, and to apply the brakes for the non-steering or driving wheels by physical force alone in case of failure of power, the brake mechanism for the steering wheels being capable of being applied only by means of the power actuator. In the operation of brake mechanism embodying our invention, the average stop of the vehicle is effected by power alone, without the possibility of locking the steering or non-steering wheels on the average pavement when dry, and a larger proportion of the braking action is effected by the steering wheel brake mechanisms, as the full braking power of the actuator may be transmitted to the steering wheels simultaneously with the application of the brakes to the non-steering wheels, the physical force of the operator being applied only for emergency stops or excessive loads, and in such cases being added only to the brake mechanisms for the rear or driving wheels, which especially in the case of trucks or buses carry the greater part of the load of the vehicle and its contents, and therefore require more power for effective braking when the vehicle is heavily laden, than when it is light. The vehicle may thus be stopped more quickly and with less danger of locking the wheels even on wet pavements, and longer wear of the brakes and tires will necessarily result.

In the accompanying drawings,

Fig. 1 is a diagrammatic view illustrating an installation of our improved hydraulic brake system in an automotive vehicle.

Fig. 2 is an enlarged sectional view showing the power actuator and pressure cylinder illustrated in Fig. 1.

Fig. 3 is a diagrammatic view similar to Fig. 1 illustrating a modification of our invention.

Fig. 4 is an enlarged view partly in section of the actuator, pressure cylinders and controlling valve mechanism for the actuator illustrated in Fig. 3.

Fig. 5 is a detail sectional view of one form of valve mechanism for controlling the actuator, illustrated in Figs. 1, 3 and 4.

Fig. 6 is a view similar to Fig. 4 showing a slight modification.

Fig. 7 is a diagrammatic view similar to Figs. 1 and 3, showing another modification of our invention.

Fig. 8 is an enlarged detail view of the actuator cylinder and piston and the pressure cylinders and pistons and connections, shown in Fig. 7.

Fig. 9 is a view similar to Fig. 8, showing a slight modification.

Fig. 10 is a partial view of the controlling valve mechanism showing a slight modification.

In the embodiment of our invention illustrated in Figs. 1 and 2, 60 represents an internal combustion engine for propelling the vehicle, having the usual suction passage comprising a vertical portion, 61, and an intake manifold, 62, for supplying the charges of the cylinder from the carburetor, 63, under the control of the usual throttle valve, 64, interposed between the carburetor and the cylinders of the engine. The front or steering wheel brake mechanisms are indicated at F, F, and the non-steering or driving wheel brake mechanisms at R, R. These brake mechanisms may be of any desired type, but are shown for convenience in this instance as comprising each a brake drum, 70, brake shoes, 71, provided with retracting springs, 72, and adapted to be expanded into contact with the drum by a brake operating lever, 73. Each of the brake operating levers is connected with the piston of a hydraulic brake actuating cylinder, the brake cylinders for the front wheel brake mechanisms being indicated at 50, 50, and their pistons at 51, 51, the brake cylinders for the non-steering wheel brake mechanisms being indicated at 52, 52, and their pistons at 53, 53. The brake cylinders, 50, 50, are connected by branch pipes, 54ª, 54ª, with a common distributing pipe, 56, and the brake cylinders, 52, 52, are connected in like manner by branch pipes, 55, 55, with a common distributing pipe, 57. In this instance we have shown both of the common pipes, 55 and 54, connected, as hereinafter described, with a single pressure cylinder, indicated at 80, rigidly secured to the chassis of the vehicle and closed at its outer end by head, 81, and provided with a pressure piston, indicated at 83, operatively connected with the power actuator. The pressure cylinder, 80, is also provided with a second piston, 82, the normal position of which is between the piston, 83, and the closed end of the cylinder, the piston, 82, being provided with a piston rod, 84, extending through the head, 81, and provided with an attaching lug, 85.

The power actuator may be of any desired type, as may be preferred and as illustrated, for example, in our former Letters Patent of the United States No. 1,583,117, dated May 4, 1926 and No. 1,582,118 dated April 27, 1926. In the present instance we have shown a single acting power actuator having its piston normally submerged in atmospheric pressure when in the released position, and comprising a cylinder, 1, closed at one end by head, 2, and open at the other end, the cylinder being rigidly secured with respect to the chassis coaxially with the hydraulic pressure cylinder, 80, the rear end of which is conveniently threaded, as indicated at 86, and screwed upon a threaded boss, 2ª, on the head, 2, of the actuator cylinder. 3 represents the actuator piston provided with a hollow piston rod, 5, extending through the piston and through a stuffing box, 6, in the head, 2, of the cylinder, and connected with the hydraulic pressure piston, 83, the piston rod being provided with a stop, 7, for limiting the return movement of the piston, 3, and the pressure piston, 83, to their released positions. In the construction shown, the bore or passage, 8, within the hollow piston rod, 5, communicates directly with the portion of the pressure cylinder, 80, between the pistons, 83 and 82, and the rear end of the hollow piston rod is connected by means of a pipe, a portion at least of which is flexible as indicated at 56, with the common pipe, 54, communicating with the brake cylinders, 50, 50, for the steering wheels. The portion of the hydraulic cylinder, 80, between the auxiliary piston, 82, and the closed end of the cylinder is connected by a pipe, a portion at least of which is flexible, as indicated at 57, with a common pipe, 55, communicating with the brake cylinders, 52, 52, for the non-steering wheels.

The rear face of the piston, 3, of the power actuator is at all times subjected to atmospheric pressure, and means are provided for connecting the cylinder, 1, between the piston and the closed end of the cylinder, 1, with the suction passage of the engine and with the atmosphere under the control of suitable controlling valve mechanism constructed to automatically connect the said portion of the cylinder, 1, with the atmosphere, when the parts are in released position, so as to maintain the piston, 3, submerged in atmosphere, or in other words, in the higher fluid pressure. In Fig. 5 we have shown one form of valve mechanism suitable for this purpose, the specific construction of which is not claimed herein, as it forms the subject matter of a separate application for Letters Patent of the United States filed by us March 13, 1926, and given Serial No. 94,412. This valve mechanism will therefore only be described sufficiently to enable its operation to be understood.

As shown in Fig. 5, the controlling valve mechanism comprises a casing, 10, containing a central valve chamber, 17, having oppositely disposed valve seats, 15 and 16, adapted to be engaged by oppositely disposed valves, 40 and 41; the valve chamber and valves being located between end chambers, 13 and 14, in the casing of which the chamber, 13, is connected by a suction pipe, 26, a portion, 26ª, of which is flexible, with the suction passage of the engine between the throttle valve and the engine cylinders. In this instance the suction pipe, 26, is shown connected with the intake manifold, 62, and provided with a check valve, 26ᵇ, opening in a direction toward the manifold. The chamber, 14, is connected by an aperture, 12, with the atmosphere. The valves, 40 and 41, are preferably formed of molded cork, cork composition, rubber, or other suitable material, and are provided with central apertures which engage with a sealing fit, a hollow valve actuating sleeve, 20. The valves are pressed yieldingly toward their seats by suitable means, as spring, 42, and the valve sleeve, 20, is provided with collars, 40ª and 41ª, for effecting the opening of one valve after permitting the other to be closed, by a movement in either direction. The valve mechanism is operated by a relative movement between the casing, 10, and the valve sleeve, 20. In this instance the valve casing is connected by a link rod, 76, with an operator operated part, as a pedal lever, 77, provided with the usual retracting spring 78. The sleeve, 20, is operatively connected in this instance with the piston rod, 84, of the auxiliary piston, 82, in the pressure cylinder, 80, which is substantially equivalent to connecting it through the intervening pressure fluid for movement with the pressure piston, 83, and actuator piston, 3, while at the same time permitting the piston, 82, to be moved to a certain extent forwardly with respect to the piston, 83, as hereinafter more fully explained. The extent of lost motion between the valve actuating sleeve, 20, and the valve casing, 10, is limited, so as to provide sufficient movement to effect the operation of the valve mechanism, and in this instance the valve actuating sleeve is provided with a collar, 28, adapted to engage an adjustable sleeve, 29, at the rear end of the valve casing, through which the sleeve, 20, passes with a sealing fit, provided by a sealing member, 29ª, and a movement of the sleeve in the opposite direction with respect to the valve casing is limited in this instance by the engagement of the closed inner end of the sleeve, 20, with the end of a guiding recess in the casing, which it engages. The sleeve, 20, is provided with an aperture, 27, communicating at all nes with the valve chamber, 17, and said sleeve also provided with a connection, 31, communicating with the interior of the sleeve, which is connected by a pipe, 32, with the actuator cylinder, 1, forward of the piston. When the valve mechanism is in released position, in which it is shown in Fig. 5, the retracting spring, 78, of the foot lever holds the casing, 10, in retracted position with respect to the sleeve, 20, maintaining the air inlet valve, 41, in open position, so as to connect with the cylinder, 1, with the atmospheric aperture, 12, and maintain the piston, 3, of the power actuator submerged in atmospheric air, and the pressure thereon equalized.

The parts being in the positions indicated in Figs. 1, 2 and 5 and the engine running, if it is desired to apply the brakes the operator will place his foot on the pedal lever, 77, and depress , thereby moving the valve casing in the direction of the arrow, Figs. 1 and 5, thereby opening the suction valve, 40, after the air inlet valve is closed, and establishing a connection between the suction pipe, 26, and the actuator cylinder, 1, forward of the piston, and withdrawing the air from the cylinder forward of the piston. The actuator piston, 3, will be moved forward in the direction of the arrows, Figs. 1 and 2, by the action of the atmospheric air on the outer face of the piston, the force of the actuator piston, 3, being exerted through the primary pressure piston, 83, on the liquid in the pressure cylinder, 80, indicated at $x$, between said piston, 83, and the secondary piston 82, the pressure being equally exerted through the secondary piston, 82, on the liquid, indicated at $y$, in the cylinder, 80, between the secondary piston and the closed end of the cylinder. Portions of the liquid, indicated at $x$, will be forced out of the cylinder, 80, through the hollow piston rod, 5, and pipe, 56, and its connections to the brake cylinders, 50, 50, of the steering wheel brakes, and portions of the liquid, $y$, will be forced out of the cylinder, 80, through pipe, 57, and its connections to the brake cylinders, 52, 52, for the non-steering wheel brake mechanisms.

All the brake mechanisms will therefore be applied simultaneously and will exert the predetermined braking force upon the steering wheels and non-steering wheels determined by the sizes of their respective brake cylinders and the leverages at which their pistons are respectively connected with the brake mechanisms which they operate, the maximum power of the actuator, as before stated, being such that the steering wheel brake mechanisms and preferably the non-steering wheel brake mechanisms as well, will not lock the wheels which they control on ordinary dry pavements or roadway.

As liquid is discharged from the cylinder, 80, forward of the secondary piston, 82, that piston will also move forward as long as the foot lever and valve casing are moved forward correspondingly, so as to maintain the suction valve, 40, open until the brake mechanisms have been applied to the desired extent. When this has been accomplished the operator will stop the forward movement of the foot lever permitting continued movement of the piston, 82, and connected valve sleeve, 20, to close the suction valve, 40, without opening the air inlet valve, 41, thus holding the brake mechanisms as applied.

To release the brake mechanisms the operator will release the pressure on the foot pedal or remove his foot therefrom, permitting the pedal to move rearwardly under the action of its retracting spring, and shifting the valve casing rearwardly with respect to the valves and sleeve, 20, so as to open the air inlet valve, 41, after the suction valve, 40, is closed whereupon atmospheric air will be again admitted to the actuator cylinder, 1, forward of the piston, diminishing the differential of fluid pressures on the piston, 3, and consequently reducing the pressure on the primary pressure piston, 83, thus permitting the brakes to relieve themselves by means of the compression of the brake linings and of the retracting springs, 72 and 78, and return the liquid previously forced into the brake cylinders to the pressure cylinder, 80, in the usual manner, in the operation of hydraulic brakes, and as the pressures on opposite faces of the actuator piston, 3, becomes equalized, the apparatus will be returned to the normal position, indicated in Figs. 1 and 2.

When the brake mechanisms have been simultaneously and fully applied to the full extent of the power of the actuator, the operator may, if he desires, add his physical force to the rear wheel brake mechanisms only, by further depressing the foot lever, 77, and fully taking up the lost motion between the valve casing and the valve actuating sleeve, 20. This will bring the collar, 28, into engagement with the sleeve, 29, and the physical force of the operator will be directly transmitted to the secondary piston, 82, causing it to move forward in the direction of the arrow, Fig. 2, and apply greater force to that portion of the liquid indicated at $y$, forward of said piston, such additional force being transmitted only to the brake cylinders, 52, 52, and applied to the rear or non-steering wheels.

If additional parts of liquid, $y$, are forced out of the cylinder, 80, by the addition of pressure on piston, 82, said piston will move forward and the piston, 83, will also move forward under the pressure of piston, 3, without increasing the pressure on the liquid, $x$, as the maximum pressure exerted by piston, 3, is constant. In this way the operator may apply his physical force to the rear wheel brake mechanisms only in compensating for additional loading of the vehicle, or in making emergency stops, without in any way increasing the braking force of the front wheels, and it will be obvious that he may also, by taking up the lost motion referred to, apply the rear wheel brake mechanisms by physical force alone in case of failure of power or when the engine is not running, in which case the secondary piston, 82, would be moved forward to expel portions of the liquid, $y$, through the pipe, 57, and its connections to the brake cylinders, 52, 52, to apply the brake mechanisms for the non-steering wheels without applying the front wheel brake mechanisms. Pistons, 83 and 3, may be moved forward by the partial rarification created in the space between the pistons, 82 and 83, when such rarification overcomes the friction of said pistons, the cylinder, 1, being vented through the open valve 40 to the atmosphere through the suction pipe 61.

In Figs. 3 and 4, we have illustrated a slightly modified construction in which the steering wheel brake mechanisms are illustrated at $F^1$, $F^1$, and the brake mechanisms for the non-steering wheels at $R^1$, $R^1$, the parts of the apparatus corresponding to those previously described being given the same reference numerals with the addition of 100 to avoid repetition.

In this construction two separate pressure cylinders are provided, one for the brake mechanisms for the steering wheels and the other for the brake mechanisms for the non-steering wheels, both being operated simultaneously by the power actuator, the latter only being connected with the foot pedal to apply the physical force of the operator to the rear wheel brake mechanisms only. 180 represents the pressure cylinder for the steering wheel brake mechanisms, said cylinder being rigidly secured to the chassis of the vehicle and provided with a piston, 183, the cylinder, 180, being connected by pipe, 156, transverse pipe, 154, and branch pipes, 154ª, with the brake cylinders, 150. 180ª represents a pressure cylinder for the non-steering wheel brake mechanisms, which is preferably so mounted that it is movable longitudinally, being in this instance supported by a hanger, 188, having a sliding engagement in a bracket, 189, secured to the chassis. The cylinder, 180ª, is prevented from movement in a direction away from the piston by any suitable means, as for example adjustable stops, indicated at 180ᵇ, in Fig. 4. The cylinder, 180ª, is provided with a piston, 182, and is connected by a pipe, a portion of which is flexible, as indicated at 157, and transverse pipe, 155, with the brake cylinders, 152, 152, for the non-steering wheel brake mechanisms. The power actuator cylinder, 101, is connected rigidly with the chassis, and provided with a piston, 103, and is connected with the valve mechanism by a flexible pipe, 132, and operates in the same manner as previously described. The piston 103 is shown provided with a piston rod 103ᵇ, having one end passing through a stuffing box 103ᶜ in the closed end of the cylinder, and the opposite end connected at 190ª to the lever 190.

The piston, 103, of the power actuator is connected with the pistons, 182 and 183, of the pressure cylinders, in this instance by means of a lever, 190, one end of which is connected at 190ª, with the piston, 103, of the actuator, the piston, 183, being connected at 190ᵇ, to the opposite end, and the piston, 182, being connected to the lever at 190ᶜ, between its ends, the construction being such that when the actuator piston, 103, moves inwardly to effect a power stroke thereof, its power will be applied simultaneously and at the proper leverages desired to force the pistons, 182 and 183, inwardly, and apply pressure to the liquid contained therein. We have shown the portion of the controlling valve mechanism connected with the foot lever, in this instance the valve casing, 110, connected by a link, 186, to one end of a lever, 187, pivoted at 187ª, to a fixed part connected with the chassis and having its other end connected to the longitudinally movable pressure cylinder, 180ª, for the rear or non-steering wheel brakes, the valve actuating sleeve, 120, being connected by a link, 191, with a lever, 192, pivoted at one end to a bracket or support, 193, secured to the chassis and being also connected with the piston, 182, of the pressure cylinder, 180ª, said lever, 192, being shown in Fig. 4 as connected to the piston rod, 184, of the piston, 182, at the point, 190ᶜ, where this connected to lever, 190. This construction not only permits the operator to apply his physical force to the brake mechanisms for the rear or non-steering wheels but also provides a reactionary feature for the foot pedal to inform the operator as to the amount of pressure applied to the brakes.

When the operator first depresses his foot to move the valve casing, 110, will be drawn forward with respect to the valve actuating sleeve, 120, and thus through the lever, 187, and its connections move the cylinder, 180ª, in the direction of arrow, C, Fig. 4, toward its piston, 182, forcing some liquid into the brake cylinders, 152, commencing to build up resistance. Simultaneously, the operation of the valve mechanism will cause the actuator piston, 103, to move forward and by its connections with the pressure pistons increase the pressure in cylinders, 180 and 180ª, to apply all the brakes by power. The increasing pressure in cylinder, 180ª, would therefore be directly communicated to the foot pedal and will operate against the foot of the operator, and if the operator continues to move his foot forward which would be necessary to keep the valve mechanism in position to continue the power stroke of the piston he will be obliged to exert an increasing amount of pressure on the foot pedal which will correspond with the pressure transmitted to the brake mechanisms, and he will be enabled to determine by the increase in the resistance against his foot the degree of pressure applied to the brakes. It will be seen that the actuator will apply its power in the direction of the arrow $b$, Fig. 4, to the liquid, indicated at $x$, in the cylinder, 180, and in the direction of the arrow $a^1$, Fig. 4, to the liquid indicated at $y$, in the cylinder, 180ª, and the pressure will be transmitted from each of said pressure cylinders to the brake cylinders connected therewith, thus applying all of the brakes simultaneously, and distributing the power of the actuator in the predetermined manner according to the sizes of the cylinders and pistons and the leverages in the connections between the power actuator and the pressure pistons, and between the pistons of the hydraulic brake cylinders and their respective brake mechanisms.

When the brakes are fully applied to the extent of the power of the actuator, the operator can add the remainder of his physical force to the brake mechanisms for the non-steering wheels only, by further depressing the foot lever, so as to take up the lost motion between the valve casing and the valve actuating sleeve in the manner previously described, and apply his physical force to the piston, 182, in the direction of the arrow, $a^1$, in Fig. 4, so as to apply additional pressure to the liquid, indicated at $y$, which will be transmitted through the pipe, 157, and its connection to the hydraulic brake cylinders for the non-steering wheels only. It will also be seen that in case of failure of power or when the engine is not running, the operator, by depressing the foot pedal and taking up the lost motion before referred to, can effect a movement of the cylinder, 180ª, in the direction of the arrow $c$, through lever 187, and a movement of the piston, 182, in the direction of the arrow $a^1$, through link 191, and lever, 192, and apply the brake mechanisms for the non-steering wheels by physical force alone, the relative movement of the valve casing, 110, and the valve actuating sleeve, 120, placing the valves in position to vent the actuator cylinder, 101 as previously described in connection with Fig. 1, and permit the piston, 103, to move freely therein without other resistance than the friction of said piston and cylinder. The amount of physical force which the operator may exert will depend upon the leverages between the pedal lever and valve casing, and between the pedal and the controlling valve mechanism, and between the valve casing and pressure cylinder 180, and between the valve actuating sleeve and the piston 182.

In Fig. 6 we have shown an arrangement similar to that illustrated in Figs. 3 and 4, the corresponding parts being given similar numerals to those used in connection with Figs. 1 and 2, with the addition of 200 to avoid repetition. In this construction the valve actuating sleeve is shown connected by a link, 291, with a lever, 292, pivoted at 293, to a rigid part of the chassis, the lever, 292, being pivoted as at 290°, between its ends to the piston rod, 284, of piston 282, of the pressure cylinder for the rear or non-steering wheel brake mechanisms.

The other parts are identical to those shown in Figs. 3 and 4, and the operation is as previously described with reference to those figures except that when the operator applies his physical force to the brake mechanism for the rear or non-steering wheels his force will be applied at increased leverage equal to the difference between the length of lever 292, and the distance from 290° to 293.

It will be understood that the leverage at which the physical force of the operator may be applied through lever 292, and through lever 287, (and corresponding levers 192 and 187, Figs. 3 and 4) may be varied as desired according to the views of the different designers.

In Figs. 7, 8 and 9, we have shown another arrangement, and a slight modification thereof for doubling the power and efficiency of the actuator without increasing its size. Thus in Figs. 7 and 8 in which the parts corresponding to those in Figs. 1 and 2 are given the same reference numerals with the addition of 300, we have shown an arrangement in which the actuator cylinder, 301, is pivotally connected with a bar indicated at 390, and two pressure cylinders, 380 and 380ª, for the steering and non-steering wheel brake mechanisms respectively are pivotally connected to the bar 390 on opposite sides of the actuator cylinder 301.

The respective actuator piston, 303, and pressure pistons, 382 and 383, are similarly connected by their piston rods to a bar, 390ª, either of said bars being supported on the chassis, so as to be relatively movable toward the other. In Figs. 7 and 8, we have shown the bar, 390ª, connected with the pistons, 303, 382 and 383, fixed to the chassis at 390ᵈ, and the bar, 390, movable with respect to chassis members, 390ᵉ. The actuator cylinder is connected with the controlling valve mechanism, as hereinbefore described, by pipe, 332, the cylinder, 380, is connected by pipe, 356, which the brake cylinders for the steering wheel brakes and cylinder, 380ª, is connected by pipe, 357, with the brake cylinders for the non-steering wheel brakes.

A pulley, 392, is mounted on the bar, 390ª, and a flexible connection, 391, extends from the valve actuating part or sleeve, 320, around said pulley to the movable bar, 390. Where a flexible cable is used to connect a movable portion of the valve mechanism with a movable portion, or portions of the pressure cylinder (Fig. 8) in place of a rigid link, it will be necessary to provide a retracting spring tending to move said movable portion of the valve mechanism, in a direction to restore the movable parts of the valve mechanism into their released or off positions when permitted to do so by a power movement of the parts connected with the pressure cylinder or by a released movement of the operator operated part. Thus, in Fig. 10, we have shown a partial sectional view of the valve mechanism illustrated in Fig. 5, in which a retracting spring, 328ª, is inserted between the collar, 328, and the adjustable sleeve, 329. Where this spring, 328ª, is employed the customary spring, 378, for the pedal lever may be employed or omitted, as preferred.

It may also be desirable to provide the bar, 390, connected with the cylinders in Fig. 8, with retracting means, as springs, 390ᵇ, and it will also be desirable to provide stops, as the adjusting screws, 390ᶜ, connected with the chassis for limiting the return movement of the cylinders under the action of the retracting springs, 390ᵇ. When the operator presses on the foot pedal the valve casing will be moved forward with respect to the valve sleeve, compressing the spring, 328ª, seating the air inlet valve, and opening the suction valve, and withdrawing the air from the actuator cylinder, 301. Obviously this will effect the movement of the cylinder, 301, toward its piston and will cause the pressure cylinders, 380 and 380ª, to move toward their pistons and apply all of the brakes by power. The pivotal connections between the cylinders and the bar, 390, will permit equalization of pressures applied to the brakes. When the forward movement of the foot of the operator stops, the further slight movement of the actuator cylinder will slightly relax the cable, 391, permitting the spring, 328ª, to move the valve casing rearwardly with respect to the valve sleeve and close the suction valve, thus holding the brakes as applied. By further releasing the pedal, the spring, 328ª, will be permitted to open the air inlet valve and admit air to the actuator cylinder, 301, permitting the pressure cylinders to be returned under the action of their retracting spring, and restoring the springs to the released position.

When the brakes have been applied to the maximum extent of the power of the actuator, the physical force of the operator may be added to the pressure cylinder, 380ª, through the flexible connection, 391, and thereby to the brakes for the non-steering wheels, without applying any additional force to the other hydraulic cylinder, 380, or to the brakes for the steering wheels.

In Fig. 9 we have shown a slight modification of this arrangement in which similar parts to those in Figs. 1 and 2 are given the same reference numerals with the addition of 400. In this figure the cylinders are shown as cast in one block and supported rigidly with respect to chassis member, 490ᵈ, in this connection the part 490 is connected directly to the chassis while the part 490ª is pivotally secured to the pistons 403, 482 and 483, and is retracted by means of springs 490ᵇ, its normal position being against stops 490ᶜ carried by the chassis by members, 490ᵉ. The construction is otherwise as just described with reference to Figs. 7 and 8, and the operation will be the same as that previously described for these figures.

It will be understood that the hydraulic systems may be provided with any preferred means for filling them with liquid and maintaining them in completely filled condition to compensate for leakage, but these features are not shown herein, as they have no bearing on our present invention.

What we claim and desire to secure by Letters Patent is:—

1. In a hydraulic brake system for automotive vehicles, the combination with independently operable brake mechanism for a plurality of pairs of wheels including steering and non-steering wheels, hydraulic brake cylinders and pistons operatively connected with said brake mechanisms, hydraulic pressure applying means communicating with said brake cylinders, of a power actuator operatively connected with said pressure applying means and comprising relatively movable parts, controlling valve mechanism for said actuator, means for connecting said actuator between said relatively movable parts with sources of higher and lower fluid pressures under the control of said valve mechanism, an operator operated part for said valve mechanism for applying all of said brake mechanisms simultaneously by said power actuator, said operator operated part being operatively connected with the brake mechanisms for wheels other than the steering wheels, to enable the operator to apply his physical force thereto in addition to the power of the actuator, and to apply said brake mechanisms by physical force alone in case of failure of power, without applying his physical force to the brake mechanisms for the steering wheels.

2. In a hydraulic brake system for automotive vehicles, the combination with independently operable brake mechanisms for a plurality of pairs of wheels including steering and non-steering wheels, hydraulic brake cylinder and pistons operatively connected with said brake mechanisms, hydraulic pressure applying means communicating with said brake cylinders, of a power actuator operatively connected with said pressure applying means and comprising relatively movable parts, controlling valve mechanism for said actuator, means for connecting said actuator between said relatively movable parts with sources of higher and lower fluid pressures under the control of said valve mechanism, the said power actuator, pressure applying means and hydraulic brake cylinders, and the connections between the latter and said brake mechanisms, being constructed to effect the simultaneous application of all of said brake mechanisms to a predetermined extent as to each, an operator operated part connected with the controlling valve mechanism for the actuator, and operatively connected with the brake mechanisms other than the steering wheel brake mechanisms to permit the operator to apply his physical force to said brake mechanisms in addition to that of the actuator, or to apply said brake mechanisms by physical force in case of failure of power without applying his physical force to the brake mechanisms for the steering wheels.

3. In a hydraulic brake system for automotive vehicles, the combination with independently operable brake mechanisms for a plurality of pairs of wheels including steering and non-steering wheels, hydraulic brake cylinders and pistons operatively connected with said brake mechanisms, hydraulic pressure applying means communicating with said brake cylinders, of a power actuator operatively connected with said pressure applying means and comprising relatively movable parts, controlling valve mechanism for said actuator, means for connecting said actuator between said relatively movable parts with sources of higher and lower fluid pressures under the control of said valve mechanism, an operator operated part for said valve mechanism for applying all of said brake mechanisms simultaneously by said power actuator, and means for connecting said operator operated part with said pressure applying means, constructed to apply the physical force of the operator to the hydraulic brake cylinders for the non-steering wheels only.

4. In a hydraulic brake system for automotive vehicles, the combination with independently operable brake mechanisms for a plurality of pairs of wheels including steering and non-steering wheels, hydraulic brake cylinders and pistons operatively connected with said brake mechanisms, hydraulic pressure applying means communicating with said brake cylinders, of a power actuator operatively connected with said pressure applying means and comprising relatively movable parts, controlling valve mechanism for said actuator, means for connecting said actuator between said relatively movable parts with sources of higher and lower fluid pressures under the control of said valve mechanism, the said actuator, pressure applying means, hydraulic brake cylinders, and the connections between the pistons of the latter and the brake mechanisms being constructed to effect the simultaneous application of all of said brake mechanisms to a predetermined extent as to each, an operator operated part connected with the controlling valve mechanism for the actuator, and means for connecting said operator operated part with said pressure applying means, constructed to apply the physical force of the operator to the hydraulic brake cylinders for the non-steering wheels only.

5. In a hydraulic brake system for automotive vehicles provided with an internal combustion engine having a throttle controlled suction passage, the combination with independently operable brake mechanisms for the steering and non-steering wheels, hydraulic brake cylinders and pistons operatively connected with said brake mechanisms, hydraulic pressure applying means communicating with said brake cylinders, of a power actuator operatively connected with said pressure applying means for applying all of said brake mechanisms simultaneously by power, and comprising a cylinder, a piston, controlling valve mechanism for said actuator, and means for connecting said actuator between its piston and a closed end of the cylinder with the suction passage of the engine and with a source of higher fluid pressure under the control of said valve mechanism, an operator operated part for said valve mechanism, and means including said hydraulic brake cylinders and pistons for operatively connecting said operator operated part with the brake mechanisms for non-steering wheels, to enable the operator to apply his physical force thereto, in addition to the power of the actuator, and to operate said non-steering wheel brake mechanisms by physical force alone in case of failure of power.

6. In a hydraulic brake system for automotive vehicles provided with an internal combustion engine having a throttle controlled suction passage, the combination with independently operable brake mechanisms for the steering and non-steering wheels, hydraulic brake cylinders and pistons operatively connected with said brake mechanisms, hydraulic pressure applying means communicating with said brake cylinders, of a power actuator operatively connected with said pressure applying means for applying all of said brake mechanisms simultaneously by power, and comprising a cylinder, a piston, controlling valve mechanism for said actuator, and means for connecting said actuator between its piston and a closed end of the cylinder with the suction passage of the engine and with a source of higher fluid pressure under the control of said valve mechanism, said power actuator, pressure applying means, and hydraulic cylinders, and the connections of the latter with said brake mechanisms being constructed to effect the simultaneous application of all of said brake mechanisms to a predetermined extent as to each, an operator operated part connected with the controlling valve mechanism for the actuator, and means including said hydraulic brake cylinders and pistons for operatively connecting said operator operated part with brake mechanisms for non-steering wheels to permit the operator to apply his physical force thereto in addition to the power of the actuator, or to apply said non-steering wheel brake mechanisms by physical force alone in case of failure of power.

7. In a hydraulic brake system for automotive vehicles provided with an internal combustion engine having a throttle controlled suction passage, the combination with independently operable brake mechanisms for the steering and non-steering wheels, hydraulic brake cylinders and pistons operatively connected with said brake mechanisms, hydraulic pressure applying means communicating with said brake cylinders, of a power actuator operatively connected with said pressure applying means for applying all of said brake mechanisms simultaneously by power, and comprising a cylinder and piston, controlling valve mechanism for said actuator, and means for connecting said actuator between its piston and a closed end of the cylinder with the suction passage of the engine and with a source of higher fluid pressure under the control of said valve mechanism, an operator operated part for said valve mechanism, and means for connecting said operator operated part with said pressure applying means, constructed to apply the physical force of the operator to the hydraulic brake cylinders for non-steering wheels, in addition to that of the actuator, or to apply said non-steering wheel brake mechanisms by physical force alone in case of failure of power.

8. In a hydraulic brake system for automotive vehicles provided with an internal combustion engine having a throttle controlled suction passage, the combination with independently operable brake mechanisms for the steering and non-steering wheels, hydraulic brake cylinders and pistons operatively connected with said brake mechanisms, hydraulic pressure applying means communicating with said brake cylinders, of a power actuator operatively connected with said pressure applying means for applying all of said brake mechanisms simultaneously by power, and comprising a cylinder and piston, controlling valve mechanism for said actuator, and means for connecting said actuator between its piston and a closed end of the cylinder with the suction passage of the engine and with a source of higher fluid pressure under the control of said valve mechanism, said actuator, pressure applying means, and hydraulic brake cylinders, and the connections from the pistons of the latter to said brake mechanisms being constructed to effect the simultaneous application of all of said brake mechanisms to a predetermined extent as to each, an operator operated part connected with said valve mechanism, and operative connections between the said operator operated part and said pressure applying means constructed to apply the physical force of the operator to the hydraulic brake cylinders for non-steering wheels only.

9. In a brake system for automotive vehicles, the combination with independently operable brake mechanisms for steering and non-steering wheels, hydraulic brake cylinders and pistons for operating said brake mechanisms, hydraulic pressure applying means having portions communicating with the brake cylinders for the steering wheels, and portions communicating with the brake cylinders for the non-steering wheels, of a power actuator for operating said pressure applying means to effect the operation of all of said brake mechanisms, and comprising a cylinder and a piston therein, operatively connected with said pressure applying means, controlling valve mechanism for said actuator, and means for connecting said actuator between its piston and a closed end of the cylinder with sources of higher and lower fluid pressures under the control of said valve mechanism, an operator operated part connected with said valve mechanism for applying all of said brake mechanisms simultaneously by power, and operatively connected with the portion of said pressure applying means communicating with the brake cylinders for non-steering wheel brake mechanisms without applying the physical force of the operator to the brake mechanisms for the steering wheels.

10. In a brake system for automotive vehicles, the combination with independently operable brake mechanisms for steering and non-steering wheels, hydraulic brake cylinders and pistons for operating said brake mechanisms, hydraulic pressure applying means having portions communicating with the brake cylinders for the steering wheels, and portions communicating with the brake cylinders for the non-steering wheels, of a power actuator for operating said pressure applying means to effect the operation of all of said brake mechanisms, and comprising a cylinder and a piston therein, operatively connected with said pressure applying means, controlling valve mechanism for said actuator, and means for connecting said actuator between its piston and a closed end of the cylinder with sources of higher and lower fluid pressures under the control of said valve mechanism, said power actuator, pressure applying means, hydraulic brake cylinders, and the connections between the pistons thereof and the brake mechanisms being constructed to effect the simultaneous application of all the brake mechanisms to a predetermined extent as to each, an operator operated part connected with the controlling valve mechanism for the actuator to apply all of said brake mechanisms by power, and operatively connected with the portion of said pressure applying means communicating with the hydraulic brake cylinders for non-steering wheels only.

11. In a brake system for automative vehicles provided with an internal combustion engine having a throttle controlled suction passage, the combination with independently operable brake mechanisms for the steering and non-steering wheels, hydraulic brake cylinders and pistons for operating said brake mechanisms, hydraulic pressure applying means having portions communicating with the brake cylinders for steering wheel brake mechanisms and other portions communicating with the brake cylinders for non-steering wheel brake mechanisms, of a power actuator comprising a cylinder and piston operatively connected with said pressure applying means for operating all of said brake cylinders simultaneously, controlling valve mechanism for said actuator, means including said valve mechanism for connecting said actuator between the piston and a closed end of the cylinder with the suction passage of the engine and with a source of higher fluid pressure, an operator operated part for said valve mechanism for applying all of said brake mechanisms simultanenously by power, and means for connecting said operator operated part with the portion of said pressure applying means communicating with the brake cylinders for non-steering wheel brake mechanisms only.

12. In a brake system for automotive vehicles provided with an internal combustion engine having a throttle controlled suction passage, the combination with independently operable brake mechanisms for the steering and non-steering wheels, hydraulic brake cylinders and pistons for operating said brake mechanisms, hydraulic pressure applying means having portions communicating with the brake cylinders for steering wheel brake mechanisms and other portions communicating with the brake cylinders for non-steering wheel brake mechanisms, of a power actuator comprising a cylinder and piston operatively connected with said pressure applying means for operating all of said brake cylinders simultanenously, controlling valve mechanism for said actuator, means including said valve mechanism for connecting said actuator between the piston and a closed end of the cylinder with the suction passage of the engine and with a source of higher fluid pressure, the said power actuator, pressure applying means, brake cylinders and connections from the pistons of the latter to the brake mechanisms being constructed to effect the simultaneous application of all of said brake mechanisms to a predetermined extent as to each, an operator operated part connected with the controlling valve mechanism for the actuator, and means for operatively connecting said operator operated part with the portion of said pressure applying means communicating with the brake cylinders for non-steering wheel brake mechanisms only.

13. In a brake system for automotive vehicles, the combination with independently operable brake mechanisms for steering and non-steering wheels, hydraulic brake cylinders and pistons for operating said brake mechanisms, hydraulic pressure applying means comprising cylindrical portions one of which communicates with the brake cylinders for operating the steering wheel brake mechanisms, and a cylindrical portion communicating with the brake cylinders for operating non-steering wheel brake mechanisms, and a pressure piston in each of said cylindrical portions, of a power actuator comprising a cylinder and a piston therein, operatively connected with the pressure applying means to apply its pressure to the liquid in both of said cylindrical portions simultaneously, and to effect the simultaneous operation of all of said brake mechanisms, controlling valve mechanism for the actuator, means for connecting the actuator cylinder between its piston and the closed end of the cylinder with sources of higher and lower fluid pressures under the control of said valve mechanism, an operator operated part connected with said valve mechanism, and connected by means providing lost motion with a portion of said pressure applying means to enable the operator to apply his physical force to the liquid in said cylindrical portion communicating with the hydraulic brake cylinders for non-steering wheel brake mechanisms only.

14. In a brake system for automotive vehicles, the combination with independently operable brake mechanisms for steering and non-steering wheels, hydraulic brake cylinders and pistons for operating said brake mechanisms, hydraulic pressure applying means comprising cylindrical portions communicating with the brake cylinders for operating the steering wheel brake mechanisms, and cylindrical portions communicating with the brake cylinders for operating non-steering wheel brake mechanisms, and a pressure piston in each of said cylindrical portions, of a power actuator comprising a cylinder and a piston therein, operatively connected with the pressure applying means to apply its pressure to the liquid in both of said cylindrical portions simultaneously, and to effect the simultaneous operation of all of said brake mechanisms, controlling valve mechanism for the actuator, means for connecting the actuator cylinder between its piston and the closed end of the cylinder with sources of higher and lower fluid pressures under the control of said valve mechanism, an operator operated part connected with said valve mechanism, and operatively connected by means providing lost motion with one of said pressure pistons, to enable the operator to apply his physical force to the liquid in said cylindrical portion communicating with the brake cylinders for non-steering wheel brake mechanisms only.

15. In a brake system for automotive vehicles provided with an internal combustion engine having a throttle controlled suction passage, the combination with independently operable brake mechanisms for steering and non-steering wheels, hydraulic brake cylinders and pistons for operating said brake mechanisms, hydraulic pressure applying means comprising a cylindrical portion communicating with the hydraulic brake cylinders for the steering wheel brake mechanisms, a cylindrical portion communicating with the hydraulic brake cylinders for non-steering wheel brake mechanisms, and separate pistons in said cylindrical portions, of a power actuator comprising a cylinder, a piston therein operatively connected to transmit the power of the actuator to the liquid in both of said cylindrical portions, controlling valve mechanism for the actuator, means for connecting the actuator between the piston and a closed end of the cylinder with the suction passage of the engine and with a source of higher fluid pressure under the control of said valve mechanism, an operator operated part connected with said valve mechanism for effecting the simultaneous application of all of said brake mechanisms by power, and operatively connected by means permitting lost motion with said pressure applying means to enable the operator to apply his physical force to the liquid in said cylindrical portion communicating with the hydraulic brake cylinders for non-steering wheel brake mechanisms only.

16. In a brake system for automotive vehicles provided with an internal combustion engine having a throttle controlled suction passage, the combination with independently operable brake mechanisms for steering and non-steering wheels, hydraulic brake cylinders and pistons for operating said brake mechanisms, hydraulic pressure applying means comprising a cylindrical portion communication with the hydraulic brake cylinders for the steering wheel brake mechanisms, a cylindrical portion communicating with the hydraulic brake cylinders for non-steering wheel brake mechanisms, and separate pistons in said cylindrical portions, of a power actuator comprising a cylinder, a piston therein operatively connected to transmit the power of the actuator to the liquid in both of said cylindrical portions, controlling valve mechanism for the actuator, means for connecting the actuator between the piston and a closed end of the cylinder with the suction passage of the engine and with a source of higher fluid pressure under the control of said valve mechanism, an operator operated part connected with said valve mechanism for effecting the simultaneous application of all of said brake mechanisms by power, and operatively connected by means permitting lost motion with a piston of said pressure applying means to enable the operator to apply his physical force to the liquid in said cylindrical portion communicating with the hydraulic brake cylinders for non-steering wheel brake mechanisms only.

17. In a hydraulic brake system for automotive vehicles the combination with brake mechanism, hydraulic means for operating the same, a hydraulic pressure applying means connected with said hydraulicly operated means, a power actuator, comprising relatively movable parts, operative connections from one of said parts to said pressure applying means, controlling valve mechanism for the actuator, means for connecting said actuator between relatively movable parts thereof with sources of higher and lower fluid pressures, under the control of said valve mechanism, and an operator operated element operatively connected with said valve mechanism, of operative connections between a part connected with said operator operated element and said pressure applying means for applying the accumulated pressure in the latter to said operator operated element, when the latter is moved in a direction to effect a power stroke of said actuator in a direction to resist the movement of the operator operated element to apply the brakes, whereby the operator is apprised of the pressure exerted on the brake mechanism by the reactionary force exerted upon the operator operated element during the power stroke of the actuator to apply the brakes and whereby the operator may apply his physical force to the brake mechanism operated by said pressure applying means.

18. In a hydraulic brake system for automotive vehicles, the combination with brake mechanism, hydraulic means for operating the same, a hydraulic pressure cylinder connected with the said hydraulic operating means, a pressure piston therein, said cylinder and piston being movable with respect to the vehicle and with respect to each other, a power actuator comprising relatively movable parts, connections from said power actuator to said pressure piston, controlling valve mechanism for said actuator, means for connecting said actuator between relatively movable parts thereof with sources of higher and lower pressures under control of said valve mechanism, and an operator operated part connected with said valve mechanism, of operative connections between a part connected with said operator operated part and said movable pressure cylinder for moving said cylinder toward its piston whereby the operator is apprised of the pressure exerted on the brake mechanism by the reactionary force exerted upon said operator operated part during the power stroke of the actuator to apply the brake and whereby the operator may apply his physical force to the brake mechanism operatively connected with said pressure cylinder.

19. In a hydraulic brake system for automotive vehicles, the combination with brake mechanism, hydraulic means for operating the same, a hydraulic pressure applying means connected with said hydraulicly operated means, a power actuator, comprising relatively movable parts, operative connections from one of said parts to said pressure applying means, controlling valve mechanism for the actuator, means for connecting said actuator between relatively movable parts thereof with sources of higher and lower fluid pressures, under the control of said valve mechanism, and an operator operated part operatively connected with said valve mechanism, said pressure applying means comprising relatively movable parts, both of which are movable with respect to the vehicles, said operator operated part being connected with one of the relatively movable parts of said pressure applying means and being connected by means providing for lost motion with the other of said relatively movable parts for moving each of said parts in a direction toward the other.

20. In a hydraulic brake system for automotive vehicles, the combination with brake mechanism, hydraulic means for operating the same, a hydraulic pressure cylinder connected with the said hydraulic operating means, a pressure piston therein, said cylinder and piston being movable with respect to the vehicle and with respect to each other, a power actuator comprising relatively movable parts, connections from said power actuator to said pressure piston, controlling valve mechanism for said actuator, means for connecting said actuator between relatively movable parts thereof with sources of higher and lower pressures, under control of said valve mechanism, an operator operated part connected with said valve mechanism, and said movable pressure cylinder for moving said cylinder toward its piston whereby the operator is apprised of the pressure exerted on the brake mechanism by the reactionary force exerted upon said operator operated part during the power stroke of the actuator to apply the brake, means providing sufficient lost motion to permit of the operation of said valve mechanism, and means for connecting the operator operated part and said pressure piston for moving the said piston in the same direction in which it is moved by a power stroke of the actuator.

21. In a hydraulic brake system for automotive vehicles provided with an internal combustion engine for propelling the vehicle, provided with a throttle controlled suction passage, the combination with a power actuator comprising relatively movable parts, controlling valve mechanism for the actuator, means for connecting said actuator between relatively movable parts thereof with the throttle controlling portion of said suction passage and with a source of higher fluid pressure under the control of said valve mechanism, brake mechanism for the vehicle, hydraulic brake applying means therefor, hydraulic pressure means operatively connected with said hydraulic brake applying means and operatively connected with said actuator, an operator operated part for said valve mechanism, and operative connections between a part connected with said operator operated part and said hydraulic pressure means for transmitting the hydraulic pressure to said operator operated part in a direction to resist the movement thereof when moved in a direction to effect a power stroke of the actuator, whereby the operator is apprised of the pressure exerted on the brake mechanism during the power stroke of the actuator and whereby the operator may apply his physical force to the brake mechanism operated by said pressure means.

22. In a hydraulic brake system for automotive vehicles provided with an internal combustion engine for propelling the vehicle, provided with a throttle controlled suction passage, the combination with a power actuator comprising relatively movable parts, controlling valve mechanism for the actuator, means for connecting said actuator between relatively movable parts thereof with the throttle controlled portion of said suction passage and with a source of higher fluid pressure under the control of said valve mechanism, brake mechanism for the vehicle, hydraulic brake applying means therefor, a hydraulic pressure cylinder connected with said brake applying means, a pressure piston therein, said cylinder and piston being movable with respect to each other and with respect to the vehicle, connections between the actuator and said pressure piston, an operator operated part for said controlling valve mechanism, and operative connections between a part connected with the operator operated part, and said movable pressure cylinder.

23. In a hydraulic brake system for automotive vehicles provided with an internal combustion engine for propelling the vehicle, provided with a throttle controlled suction passage, the combination with a power actuator comprising relatively movable parts, controlling valve mechanism for the actuator, means for connecting said actuator between relatively movable parts thereof with the throttle controlling portion of said suction passage and with a source of higher fluid pressure under the control of said valve mechanism, brake mechanism for the vehicle, hydraulic brake applying means therefor, a hydraulic pressure applying means comprising relatively movable parts, both of which are movable with respect to the vehicle, connections from one of said parts to the actuator, and an operator operated part for said valve mechanism connected with the other of the relatively movable parts of said pressure applying means.

24. In a hydraulic brake system for automotive vehicles provided with an internal combustion engine for propelling the vehicle, provided with a throttle controlled suction passage, the combination with a power actuator comprising relatively movable parts, controlling valve mechanism for the actuator, means for connecting said actuator between relatively movable parts thereof with the throttle controlling portion of said suction passage and with a source of higher fluid pressure under the control of said valve mechanism, brake mechanism for the vehicle, hydraulic applying means therefor, a hydraulic pressure applying means comprising relatively movable parts, both of which are movable with respect to the vehicle, connections from one of said parts to the actuator, an operator operated part for said valve mechanism connected with the other of the relatively movable parts of said pressure applying means, and operative connections providing sufficient lost motion to permit the operation of said controlling valve mechanism for connecting the movable part of said hydraulic pressure means to which the actuator is connected with a part connected with said operator operated part.

25. In a hydraulic brake system for automotive vehicles, the combination with independently operable brake mechanisms for a plurality of pairs of wheels, including steering and non-steering wheels, hydraulic cylinders and pistons for applying said brake mechanisms, separate hydraulic pressure cylinders connected respectively with the brake applying cylinders for steering wheels and non-steering wheels, a pressure piston in each pressure cylinder, a power actuator comprising relatively movable parts, operative connections from said actuator to all of said pressure pistons, controlling valve mechanism for said actuator, means for connecting said actuator between relatively movable parts thereof with sources of higher and lower fluid pressures under the control of said valve mechanism, and an operator operated part connected with said valve mechanism and operatively connected with a movable part subjected to the hydraulic pressure in one only of said pressure cylinders, for transmitting said hydraulic pressure to the operator operated part in a direction to resist the movement thereof to operate the valve mechanism in a direction to effect a power stroke of the actuator to apply the brakes and whereby the operator may apply his physical force to the brakes operated by the pressure in said hydraulic pressure cylinder.

26. In a hydraulic brake system for automotive vehicles, the combination with independently operable brake mechanisms for a plurality of pairs of wheels, including steering and non-steering wheels, hydraulic cylinders and pistons for applying said brake mechanisms, separate hydraulic pressure cylinders connected respectively with the brake applying cylinders for steering wheels and non-steering wheels, a pressure piston in each pressure cylinder, a power actuator comprising relatively movable parts, operative connections from said actuator to all of said pressure pistons, controlling valve mechanism for said actuator, means for connecting said actuator between relatively movable parts thereof with sources of higher and lower fluid pressures under the control of said mechanism, and an operator operated part connected with said valve mechanism, the hydraulic pressure cylinder and piston for the brake mechanism for non-steering wheels being both movable with respect to the vehicle, and connections from the said movable pressure cylinder to a part connected with the operator operated part for imparting the hydraulic pressure in said cylinder to the operator operated part in a direction to resist the movement thereof to apply all the brakes by power, and to permit the operator to apply his physical force to the brake mechanisms for the non-steering wheels only.

27. In a hydraulic brake system for automotive vehicles, the combination with independently operable brake mechanisms for a plurality of pairs of wheels, including steering and non-steering wheels, hydraulic cylinders and pistons for applying said brake mechanisms, separate hydraulic pressure cylinders connected respectively with the brake applying cylinders for steering wheels and non-steering wheels, a pressure piston in each pressure cylinder, a power actuator comprising relatively movable parts, operative connection from said actuator to all of said pressure pistons, controlling valve mechanism for said actuator, means for connecting said actuator between relatively movable parts thereof with sources of higher and lower fluid pressures under the control of said valve mechanism, and an operator operated part connected with said valve mechanism, the hydraulic pressure cylinder and piston for the brake mechanism for non-steering wheels being both movable with respect to the vehicle, a part connected to the operator operated part, connections from said last mentioned cylinder to said part for transmitting the hydraulic pressure in said cylinder thereof in a direction to resist the movement of the operator operated part to apply all the brake mechanisms by power, and operative connections providing lost motion sufficient to permit the operation of the controlling valve mechanism between said pressure piston in said movable pressure cylinder and the operator operated part.

28. In a hydraulic brake system for automotive vehicles provided with an internal combustion engine for propelling the vehicle, having a throttle controlled suction passage, the combination with independently operable brake mechanisms for the steering and non-steering wheels, hydraulic brake cylinders and pistons for operating said brake mechanisms, separate hydraulic pressure cylinders connected respectively with the brake cylinders for the steering and non-steering wheels, a power actuator comprising a cylinder and a piston therein, connections between said piston and said pressure pistons, controlling valve mechanism for the actuator, means for connecting the actuator cylinder between a closed end thereof and the actuator piston with the suction passage of the engine and with a source of higher fluid pressure under the control of said valve mechanism, an operator operated part connected with said valve mechanism, and means for applying the hydraulic pressure in one of said pressure cylinders to the operator operated part to resist the movement of said operator operated part to effect an application of all the brake mechanisms by power and to enable the operator to apply his physical power to the brakes whose brake cylinders are connected with the said pressure cylinder.

29. In a hydraulic brake system for automotive vehicles provided with an internal combustion engine for propelling the vehicle, having a throttle controlled suction passage, the combination with independently operable brake mechanisms for the steering and non-steering wheels, hydraulic brake cylinders and pistons for operating said brake mechanisms, separate hydraulic pressure cylinders connected respectively with the brake cylinders for the steering and non-steering wheels a power actuator comprising a cylinder and a piston therein, connections between said piston and said pressure pistons, controlling valve mechanism for the actuator, means for connecting the actuator cylinder between a closed end thereof and the actuator piston with the suction passage of the engine and with a source of higher fluid pressure under the control of said valve mechanism, an operator operated part connected with said valve mechanism, one of said pressure cylinders and its piston being movable with respect to each other and to the vehicle, of operative connections from said movable cylinder to a part connected with the operator operated part for transmitting the hydraulic pressure in said cylinder to the operator operated part in a direction opposite to the direction of movement thereof to apply all the brakes by power, and connections including a provision for lost motion sufficient to insure the operation of said valve mechanism between the pressure piston in said movable cylinder and a part connected with said operator operated part.

30. In a hydraulic brake system for automotive vehicles provided with an internal combustion engine for propelling the vehicle, having a throttle controlled suction passage, the combination with independently operable brake mechanisms for the steering and non-steering wheels, hydraulic brake cylinders and pistons for operating said brake mechanisms, separate hydraulic pressure cylinders connected respectively with the brake cylinders for the steering and non-steering wheels, a power actuator comprising a cylinder and a piston therein, connections between said piston and said pressure pistons, controlling valve mechanism for the actuator, means for connecting the actuator cylinder between a closed end thereof and the actuator piston with the suction passage of the engine and with a source of higher fluid pressure under the control of said valve mechanism, an operator operated part connected with said valve mechanism, the hydraulic pressure cylinder being connected with the brake cylinders for non-steering wheels and its piston and cylinder being movable with respect to each other and with respect to the vehicle, of operative connections between said pressure cylinder and a part connected with the operator operated part for transmitting to the latter the hydraulic pressure in said cylinder in a direction opposite to its movement to apply all the brakes by power, and connections including a provision for lost motion between the pressure piston in said movable pressure cylinder and a part connected with the operator operated part for enabling the operator to apply his physical force thereto in the same direction as the actuator.

31. In a hydraulic brake system for automotive vehicles, the combination with a plurality of brake mechanisms for the wheels of the vehicle, hydraulic pressure applying means connected to said brake mechanisms, a power actuator for operating said hydraulic pressure applying means, controlling valve mechanism for said actuator, an operator operated part for operating said valve mechanism and a plurality of means cooperating with said pressure applying means for transmitting the physical force of the operator to certain of said brake mechanisms less than the whole number.

32. In a hydraulic brake system for automotive vehicles, the combination with a plurality of brake mechanisms for the wheels of the vehicle, hydraulic pressure applying means connected to said brake mechanisms, a power actuator for operating said hydraulic pressure applying means, controlling valve mechanism for said actuator, an operator operated part for operating said valve mechanism and means independent of and cooperating with said actuator, pressure applying means and valve for transmitting a reactive force to said operator operated part which is proportional to the pressure produced by the hydraulic pressure applying means.

33. In a hydraulic system for automotive vehicles, the combination with a plurality of brake mechanisms for the wheels of the vehicle, hydraulic pressure applying means connected to said brake mechanisms, a power actuator for operating said hydraulic pressure applying means, controlling valve mechanism for said actuator, an operator operated part for operating said valve mechanism, means for transmitting the physical force of the operator to certain of said brake mechanisms less than the whole number and means independent of and acting in conjunction with said pressure applying means for transmitting a reactive force to said operator operated part which is proportional to the pressure produced by the hydraulic pressure applying means.

CALEB S. BRAGG.
VICTOR W. KLIESRATH.